(12) United States Patent
Park

(10) Patent No.: US 6,882,399 B2
(45) Date of Patent: Apr. 19, 2005

(54) LIQUID CRYSTAL DISPLAY DEVICE SEALING STRUCTURE AND METHOD OF FABRICATING THE SAME

(75) Inventor: Ki-Bok Park, Kyoungsangbuk-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 78 days.

(21) Appl. No.: 10/281,949

(22) Filed: Oct. 29, 2002

(65) Prior Publication Data

US 2003/0090615 A1 May 15, 2003

(30) Foreign Application Priority Data

Oct. 31, 2001 (KR) .......................... 2001-67598

(51) Int. Cl.[7] .................. G02F 1/1339; G02F 1/136; G02F 1/1335
(52) U.S. Cl. .................. 349/153; 349/42; 349/106; 349/155; 349/190
(58) Field of Search .................. 349/42, 43, 106, 349/153, 155, 156, 190

(56) References Cited

U.S. PATENT DOCUMENTS

| | | | | |
|---|---|---|---|---|
| 5,680,189 A | * | 10/1997 | Shimizu et al. | 349/123 |
| 5,739,888 A | * | 4/1998 | Ogura et al. | 349/153 |
| 6,373,547 B1 | * | 4/2002 | Saito et al. | 349/155 |
| 6,384,882 B1 | * | 5/2002 | Nagayama et al. | 349/110 |
| 6,646,709 B1 | * | 11/2003 | Matsumoto | 349/156 |

* cited by examiner

*Primary Examiner*—Tarifur R. Chowdhury
(74) *Attorney, Agent, or Firm*—Morgan, Lewis & Bockius LLP

(57) ABSTRACT

A liquid crystal display device includes a liquid crystal panel having first and second substrates attached to each other and separated by a spacer, a sealing unit for sealing the first and second substrates along a peripheral area of the liquid crystal panel, and a sealing pattern disposed within the sealing unit.

18 Claims, 6 Drawing Sheets

LIQUID CRYSTAL DISPLAY DEVICE SEALING STRUCTURE AND METHOD OF FABRICATING THE SAME

The present invention claims the benefit of Korean Patent Application No. 67598/2001 filed in Korea on Oct. 31, 2001, which is hereby incorporated by reference.

BACKGROUND OF THE INVENTION

1. Field of the Invention

The present invention relates to a liquid crystal display device, and particularly, to a liquid crystal display device sealing structure and method of fabricating the same, wherein the seal structure includes a shield system that prevents impurities and moisture from infiltrating into the liquid crystal display device.

2. Description of the Background Art

A liquid crystal display (LCD) device is a permeation type flat panel display device, and is commonly incorporated into small power efficient devices, such mobile phones, personal digital assistants (PDA), and notebook computers. Presently, demand has increased for digital displays having improved image quality and mobility.

In general, the LCD devices can be categorized according to the method by which liquid crystal molecules are moved. One category of the LCD device is a thin film transistor (TFT) LCD that is commonly used for its rapid reaction speed and reduced amount of residual image. The TFT LCD is made by injecting liquid crystal material between a TFT substrate having a plurality of TFTs formed thereon and a color filter substrate having a color filter formed thereon, sealing the substrates together, and attaching necessary driving circuitry.

FIG. 1 is a cross sectional view of a liquid crystal display device according to the prior art. In FIG. 1, spacers 30 are disposed between a color filter substrate 10 and a TFT substrate 20 to maintain a cell gap, and a liquid crystal material 50 is injected therebetween. An outer circumference of the liquid crystal display device is sealed by a sealant 40 to prevent infiltration of impurities or moisture into the liquid crystal display device. In addition, a back light (not shown) is disposed under the TFT substrate 20 to provide light for the liquid crystal display device, and polarizing films (not shown) are attached to the color filter substrate 10 and the TFT substrate 20 to polarize the light provided by the back light (not shown).

FIG. 2 is an enlarged cross sectional view of a portion "A" of FIG. 1 representing a sealing structure of the liquid crystal display device according to the prior art. In FIG. 2, a black matrix 12 is formed on the color filter substrate 10 to prevent light from leaking through regions adjacent to a color filter layer 14, and a gate insulating layer 22 and a passivation layer 24 are formed on the TFT substrate 20. In addition, a common electrode (not shown) is formed on the color filter substrate 10 and a pixel electrode (not shown) is formed on the TFT substrate 20, and alignment layers (not shown) are formed on each of the color filter and TFT substrates.

In general, the sealing unit 40 is changed according to an overall size of the liquid crystal display device. Accordingly, the sealing unit 40 should be increased as the size of the liquid crystal display device increases to maintain a predetermined adhesive force between the color filter and TFT substrates 10 and 20. Thus, if the color filter and TFT substrates 10 and 20 are not sufficiently attached by the sealant, impurities or moisture may infiltrate into the liquid crystal material 50, and stains may be generated on a surface of the liquid crystal display device. In addition, the infiltration of the impurities or moisture into the liquid crystal material 50 may be caused by incomplete hardening of the sealing unit material.

FIG. 3 is a cross sectional view of a sealing structure and spacer pattern of a liquid crystal display device according to the prior art. In FIG. 3, a spacer pattern 32 is used for improving an aperture ratio of the liquid crystal display device by preventing uneven distribution of the ball spacers 30 (in FIG. 1). However, as discussed above, stains may also be generated due to incomplete sealing of the spacer pattern 32.

FIG. 4 is a cross sectional view of a liquid crystal cell structure of a liquid crystal display device according to the prior art. In FIG. 4, a liquid crystal cell includes a TFT substrate and a color filter substrate. The TFT substrate has a transparent glass substrate 21, a gate electrode 23a and a gate pad 23b formed on the transparent glass substrate 21, a gate insulating layer 22 formed on an entire surface of the glass substrate 21 to cover the gate electrode 23a and the gate pad 23b, a semiconductor layer 25 formed on the gate insulating layer 22, source and drain electrodes 27 formed on the semiconductor layer 25, a pixel electrode 29 made of a transparent conductive material, such as indium tin oxide (ITO), connected to one of the source and drain electrodes 27 and formed on the gate insulating layer 22 of displaying area on the liquid crystal panel, and a passivation layer 24 formed on the entire surface of the TFT substrate. The color filter substrate has a transparent glass substrate 11, a black matrix 12 formed on a region of the glass substrate 11 corresponding to the TFT formation region and the gate pad 23b formation region of the TFT substrate to block the light permeation to a non-displaying region, and a color filter layer 14 formed on the displaying region of the liquid crystal display device. In addition, the liquid crystal cell includes a common electrode (not shown) formed on the color filter substrate corresponding to the pixel electrode 29, and an alignment film (not shown) formed on the color filter and TFT substrates for aligning liquid crystal molecules in the liquid crystal material 50.

The liquid crystal display device includes an N×M matrix array of the liquid crystal cells formed on the entire substrate to form a liquid crystal display panel. The spacers 30 (in FIG. 1) are located between the color filter substrate and the TFT substrate fabricated as above, and the sealant unit 40 is applied on an outer circumferential portion of the TFT substrate. Then, the color filter and TFT substrates are attached using high pressure and high temperature. In addition, the liquid crystal material is injected between the color filter and TFT substrates, thereby completing fabrication of the liquid crystal display device.

The sealant material of the sealing unit 40 (in FIG. 3) is disposed along an outer circumference region of the liquid crystal display device, such that thin film transistors of the TFT substrate are located within the circumference region and the gate insulating layer 22, and the passivation layer 24 remains within the circumference region shown in FIG. 4. Thus, the sealing unit 40 is disposed upon the gate insulating layer 22 and the passivation layer 24.

In FIG. 4, the liquid crystal cell comprises an ITO-on-Passivation (IOP) structure. In the IOP structure, although the pixel electrode 29 is formed on the passivation layer 24, a first gap between a gate line 23b for supplying a scan signal to the gate electrode 23a and the pixel electrode 29 and a second gap between a data line (not shown) for supplying an image signal to the pixel electrode 29 through the source/drain electrode 27 and the pixel electrode 29 should be maintained. Accordingly, if the gate line 23b or the data line (not shown) overlaps a part of the pixel electrode 29 with the passivation layer 24 therebetween, a parasitic capacitance is created and a vertical crosstalk is generated. The crosstalk causes flicker of a displayed image, and lowers image quality of the liquid crystal display device.

SUMMARY OF THE INVENTION

Accordingly, the present invention is directed to a liquid crystal display device sealing structure and method of fabricating a liquid crystal display device sealing structure that substantially obviates one or more of the problems due to limitations and disadvantages of the related art.

An object of the present invention is to provide a sealing structure of a liquid crystal display device and a method of fabricating the same that prevents impurities or moisture from infiltrating into a liquid crystal material layer.

Another object of the present invention is to provide a liquid crystal display device that reduces parasitic capacitance and improves image quality.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a liquid crystal panel having first and second substrates attached to each other and separated by a spacer, a sealing unit for sealing the first and second substrates along a peripheral area of the liquid crystal panel, and a sealing pattern disposed within the sealing unit.

In another aspect, a liquid crystal display device includes a thin film transistor substrate including a plurality of thin film transistors each having a gate electrode, a gate insulating layer, a semiconductor layer, source and drain electrodes, and a passivation layer, a color filter substrate including a color filter layer, the color filter substrate attached to the thin film transistor substrate with a liquid crystal material therebetween to define a liquid crystal panel, a patterned spacer between the thin film transistor substrate and the color filter substrate to maintain a uniform cell gap therebetween, a sealing unit disposed along an outer edge of the liquid crystal panel between the thin film transistor, substrate and the color filter substrate, and a system for increasing an attachment area and an infiltration distance of impurities in the sealing unit.

In another aspect, a liquid crystal display device includes a thin film transistor substrate including a plurality of thin film transistors each having a gate electrode, a gate insulating layer, a semiconductor layer, source and drain electrodes, and a passivation layer, a color filter substrate having a color filter layer, the color filter substrate attached to the thin film transistor substrate with a liquid crystal material therebetween to define a liquid crystal panel, a patterned spacer between the thin film substrate and the color filter substrate to maintain a uniform cell gap therebetween, a sealing unit disposed along an outer edge of the liquid crystal panel to seal the thin film transistor substrate and the color filter substrate, at least one sealing pattern disposed with in the sealing unit, and at least one concavity region adjacent to the sealing unit and aligned with the sealing pattern.

In another aspect, a method for fabricating a liquid crystal display device includes forming at least one sealing pattern along a peripheral area of one of a first substrate and a second substrate, forming a plurality of spacers on the one of a first substrate and a second substrate, forming a sealing unit to surround the at least one sealing pattern, and attaching the first and second substrates along the sealing unit to define a uniform gap therebetween.

In another aspect, a method of fabricating a liquid crystal display device includes forming a sealing pattern along a peripheral portion of a color filter substrate, forming a sealing unit surrounding the sealing pattern along the peripheral portion of the color filter substrate, forming a concavity region along a peripheral portion of a thin film transistor substrate, and attaching the color filter substrate and the thin film transistor substrate along the peripheral portions of the color filter substrate and the thin film transistor substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
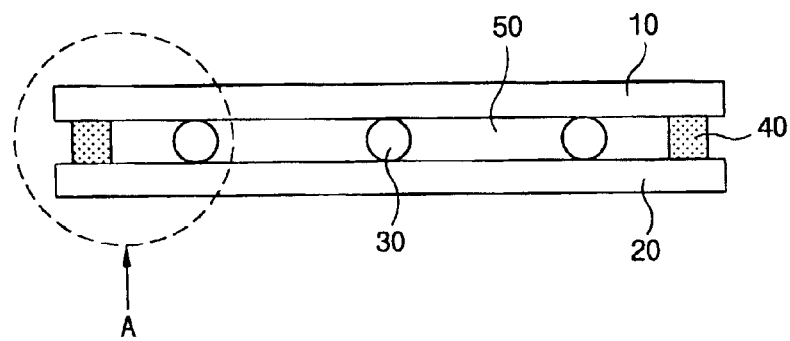
FIG. 1 is a cross sectional view of a liquid crystal display device according to the prior art.
Figure 2:
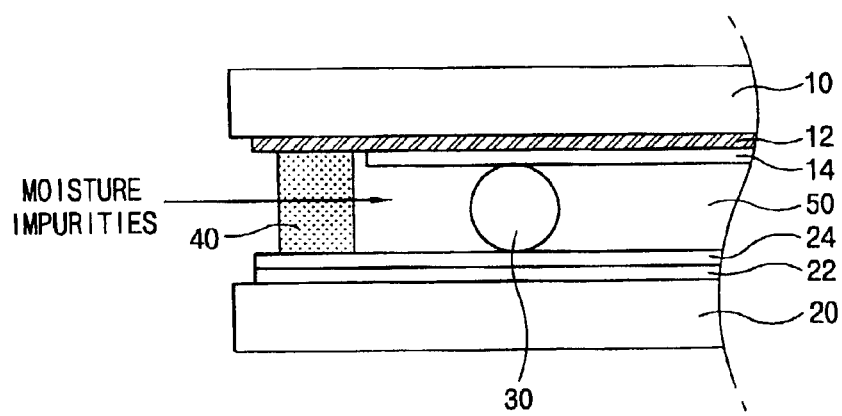
FIG. 2 is an enlarged cross sectional view of a portion "A" of FIG. 1 representing a sealing structure of the liquid crystal display device according to the prior art.
Figure 3:
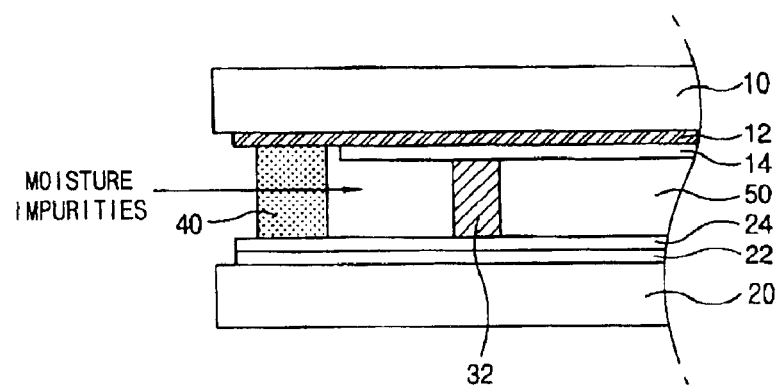
FIG. 3 is a cross sectional view of a sealing structure and spacer pattern of a liquid crystal display device according to the prior art.
Figure 4:
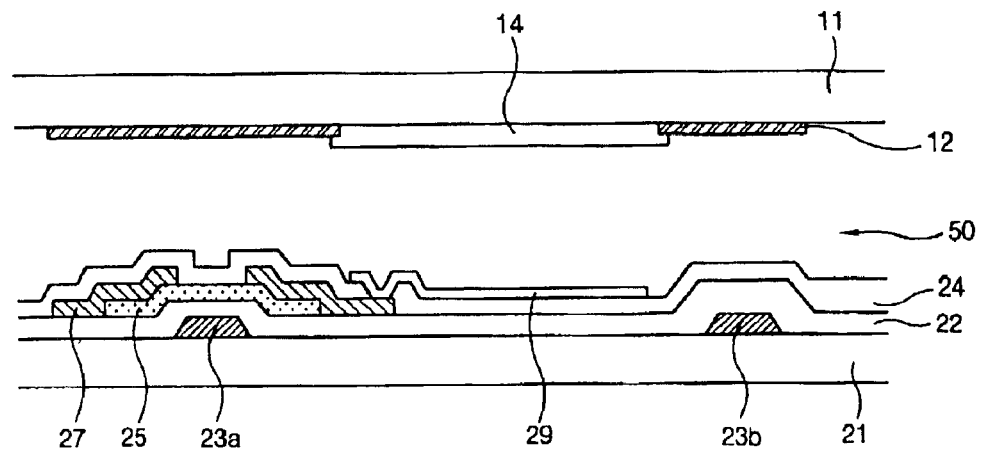
FIG. 4 is a cross sectional view of a liquid crystal cell structure of a liquid crystal display device according to the prior art.
Figure 5:
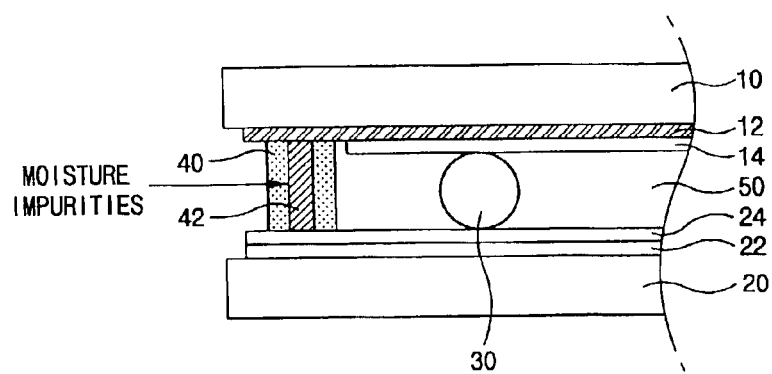
FIG. 5 is a cross sectional view of an exemplary sealing structure of a liquid crystal display device according to the present invention.

FIG. 5 is a cross sectional view of an exemplary sealing structure of a liquid crystal display device according to the present invention. In FIG. 5, a ball spacer 30 may be disposed between a color filter substrate 10, upon which a black matrix 12 and a color filter 14 may be formed, and a TFT substrate 20, upon which a gate insulating layer 22 and a passivation layer 24 may be formed. Thus, a cell gap of the liquid crystal display device may be maintained. The color filter substrate 10 and the TFT substrate 20 may be attached with each other by a sealant unit 40 that is disposed along an outer circumferential region. The sealant unit 40 may include a sealing pattern 42 of a predetermined width formed within the sealing unit 40 to prevent moisture and impurities from infiltrating into a liquid crystal material 50. The sealant unit 40 may be formed of a laminating resin, for example, and patterned before being attached to the color filter substrate 10 and the TFT substrate 20.

Although the sealing unit 40 and the sealing pattern 42 may be formed on the TFT substrate 20, it may be desirable that the sealing unit 40 and the sealing pattern 42 be formed on the color filter substrate 10. In addition, it may be desirable to form the sealing unit 40 on one of the color filter and TFT substrates 10 and 20, while forming the sealing pattern 42 on the other one of the color filter and TFT substrates 10 and 20. In addition, the sealing pattern 42 may be formed to have approximately a same height as a height of the cell gap between the color filter and TFT substrates 10 and 20.

Figure 6:
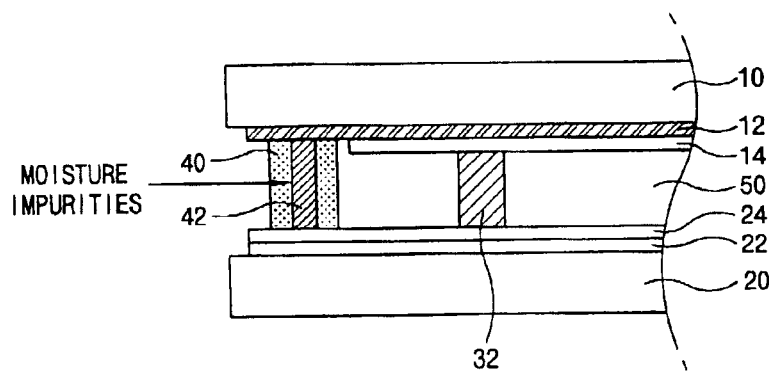
FIG. 6 is a cross sectional view of another exemplary sealing structure of a liquid crystal display device according to the present invention.

FIG. 6 is a cross sectional view of another exemplary sealing structure of a liquid crystal display device according to the present invention. In FIG. 6, a spacer pattern 32 may be formed by laminating a material, such as a resin, on a color filter substrate 10. Then, the laminated material may be patterned, thereby preventing a reduction in aperture ratio due to scattering of light by the spherical shape of the ball spacer 30 (in FIG. 5). The spacer pattern 32 and the sealing pattern 42 may be formed of different materials. However, it may desirable that the spacer pattern 32 and the sealing pattern 42 be formed of similar materials, thereby simplifying a fabrication process for forming the liquid crystal display device according to the present invention. In addition, the sealing pattern 42 for shielding impurities may be applied to a liquid crystal display device using the ball spacer 30 (in FIG. 5) or to a liquid crystal display device using the spacer pattern 32.

Figure 7:
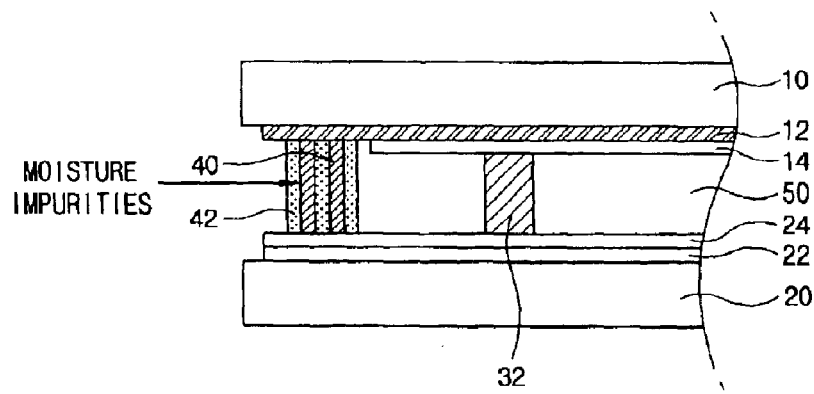
FIG. 7 is a cross sectional view of another exemplary sealing structure of a liquid crystal display device according to the present invention.

FIG. 7 is a cross sectional view of another exemplary sealing structure of a liquid crystal display device according to the present invention. In FIG. 7, a sealing unit 40 may be formed to contact both a black matrix 12 of a color filter substrate 10 and a passivation layer 24 of a TFT substrate 20. The sealing unit 40 may include a plurality of sealing patterns 42 formed within the sealing unit 40 to contact both the black matrix 12 of the color filter substrate 10 and the passivation layer 24 of the TFT substrate 20. Accordingly, the plurality of sealing patterns 42 in the sealing unit 40 effectively prevent infiltration of moisture or impurities into the liquid crystal material 50.

Figure 8:
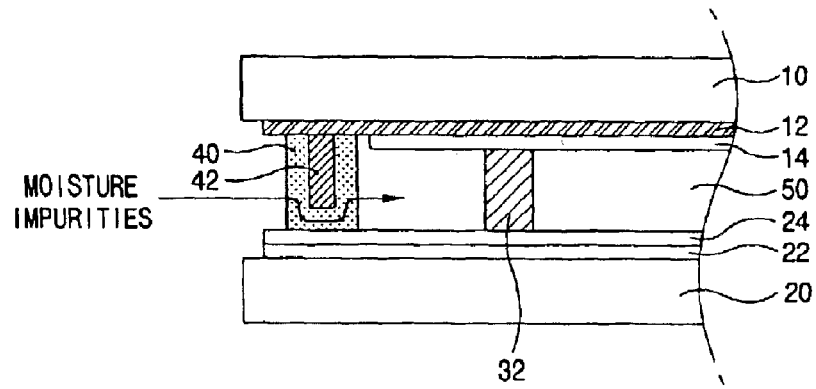
FIG. 8 is a cross sectional view of another exemplary sealing structure of a liquid crystal display device according to the present invention.

FIG. 8 is a cross sectional view of another exemplary sealing structure of a liquid crystal display device according to the present invention. In FIG. 8, a sealing unit 40 may be formed to contact both a black matrix 12 of a color filter substrate 10 and a passivation layer 24 of a TFT substrate 20. The sealing unit 40 may include a sealing pattern 42 formed within the sealing unit 40 to contact the black matrix 12 of the color filter substrate 10, wherein a height of the sealing pattern 42 is less than a height of the sealing unit. Accordingly, the sealing unit 40 improves adhesive contact between the color filter and TFT substrates 10 and 20, and the sealing pattern 42 effectively prevents infiltration of moisture or impurities into the liquid crystal material 50 through a boundary region between an upper surface of the passivation layer 24 and a lower surface of the sealing pattern 42.

Alternatively, the sealing pattern 42 may be formed within the sealing unit 40 to contact the passivation layer 24 of the TFT substrate 20. Accordingly, the sealing pattern 42 effectively prevents infiltration of moisture or impurities into the liquid crystal material 50 through a boundary region between a lower surface of the black matrix 12 and an upper surface of the sealing pattern 42.

Figure 9:
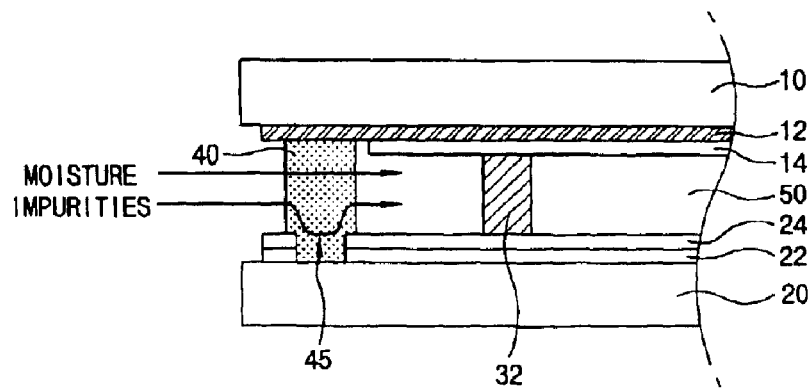
FIG. 9 is a cross sectional view of another exemplary sealing structure of a liquid crystal display device according to the present invention.

FIG. 9 is a cross sectional view of another exemplary sealing structure of a liquid crystal display device according to the present invention. In FIG. 9, a portion of a gate insulating layer 22 and a portion of a passivation layer 24 formed on a TFT substrate 10 may be removed to form the concavity region 45 that corresponds to a sealing unit 40. Alternatively, the concavity region 45 may be formed by removing only a portion of the passivation layer 24 and none of the gate insulating layer 22, or by removing the passivation layer 24 and only a portion of the gate insulating layer 22. Accordingly, the sealing unit 40 may be formed to directly contact the TFT substrate 20 and/or portions of the gate insulating layer 22 and/or the passivation layer 24. Thus, an attachment area of the sealing unit 40 and the TFT substrate 20 may be increased by forming the concavity region 45. In addition, a boundary of the TFT substrate 20 is increased, whereby an infiltration path of impurities along the boundary is also increased. Alternatively, the black matrix 12 may also include a concavity region that either extends completely through a thickness of the black matrix 12 to expose the color filter substrate 10, or may extend only partially through a thickness of the black matrix 12.

Figure 10:
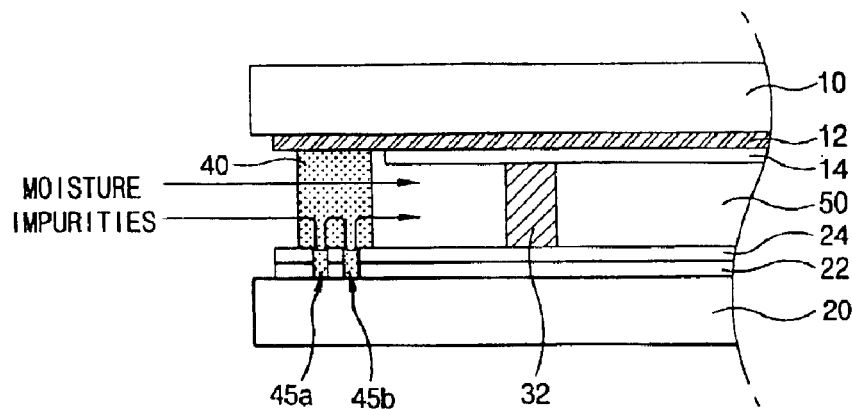
FIG. 10 is a cross sectional view of another exemplary sealing structure of a liquid crystal display device according to the present invention.

FIG. 10 is a cross sectional view of another exemplary sealing structure of a liquid crystal display device according to the present invention. In FIG. 10, a plurality of concavity regions 45a and 45b may be formed through a passivation layer 24 and a gate insulating layer 22 corresponding to the sealing unit 40. Alternatively, each or only one of the plurality of concavity regions 45a and 45b may be formed by removing only a portion of the passivation layer 24 and none of the gate insulating layer 22, or by removing the passivation layer 24 and only a portion of the gate insulating layer 22. Accordingly, the sealing unit 40 may be formed to directly contact the TFT substrate 20 and/or portions of the gate insulating layer 22 and/or the passivation layer 24. Thus, an attachment area of the sealing unit 40 and the TFT substrate 20 may be increased by forming the plurality of concavity regions 45a and 45b. In addition, a boundary of the TFT substrate 20 is increased, whereby an infiltration path of impurities along the boundary is also increased. Alternatively, the black matrix 12 may also include a concavity region that either extends completely through a thickness of the black matrix 12 to expose the color filter substrate 10, or may extend only partially through a thickness of the black matrix 12.

Figure 11:
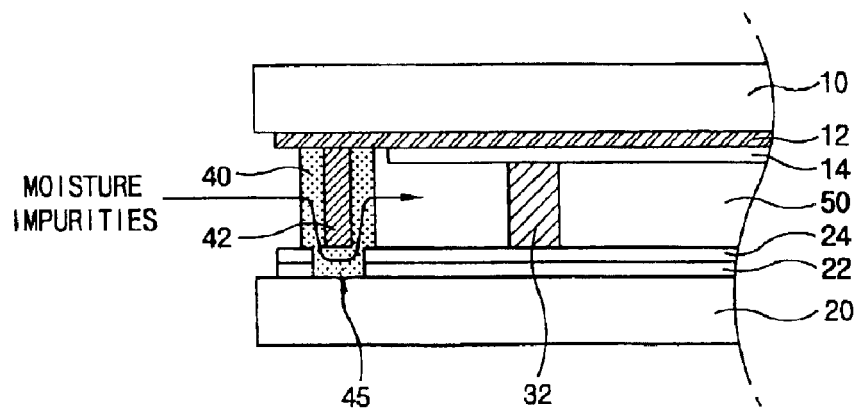
FIG. 11 is a cross sectional view of another exemplary sealing structure of a liquid crystal display device according to the present invention.

FIG. 11 is a cross sectional view of another exemplary sealing structure of a liquid crystal display device according to the present invention. In FIG. 11, a portion of a gate insulating layer 22 and a portion of a passivation layer 24 formed on a TFT substrate 10 may be removed to form the concavity region 45 that corresponds to a sealing unit 40. Alternatively, the concavity region 45 may be formed by removing only a portion of the passivation layer 24 and none of the gate insulating layer 22, or by removing the passivation layer 24 and only a portion of the gate insulating layer 22. Accordingly, the sealing unit 40 may be formed to directly contact the TFT substrate 20 and/or portions of the gate insulating layer 22 and/or the passivation layer 24. Thus, an attachment area of the sealing unit 40 and the TFT substrate 20 may be increased by forming the concavity region 45. In addition, a boundary of the TFT substrate 20 is increased, whereby an infiltration path of impurities along the boundary is also increased. Alternatively, the black matrix 12 may also include a concavity region that either extends completely through a thickness of the black matrix 12 to expose the color filter substrate 10, or may extend only partially through a thickness of the black matrix 12.

In FIG. 11, the sealing unit 40 may include a sealing pattern 42 formed within the sealing unit 40 to contact the black matrix 12 of the color filter substrate 10, wherein a height of the sealing pattern 42 is less than a height of the sealing unit 40. Accordingly, the sealing unit 40 improves adhesive contact between the color filter and TFT substrates 10 and 20, and the sealing pattern 42 effectively prevents infiltration of moisture or impurities into the liquid crystal material 50 through a boundary region between an upper surface of the passivation layer 24 and a lower surface of the sealing pattern 42. Alternatively, a lower portion of the sealing pattern 42 may extend into the concavity region 45 to further prevent infiltration of moisture or impurities into the liquid crystal material 50 through a boundary region between the lower surface of the sealing pattern 42 and an upper surface of the TFT substrate 20 or an upper surface of the gate insulating layer 22 and/or the passivation layer 24.

In the present invention, when the liquid crystal display device includes any of the sealing structures shown in FIGS. 5–11, benefits resulting from improved adhesive contact and improved prevention of impurity infiltration having at least one of the sealing patterns 42 and the concavity regions 45 may be obtained. Moreover, a plurality of combinations of each of the sealing structures shown in FIGS. 5–11 may be used in a liquid crystal display device for improved adhesive contact and improved prevention of impurity infiltration. Accordingly, extending an overall distance of the infiltration path will improve adhesive contact and improve prevention of impurity infiltration.

Figure 12:
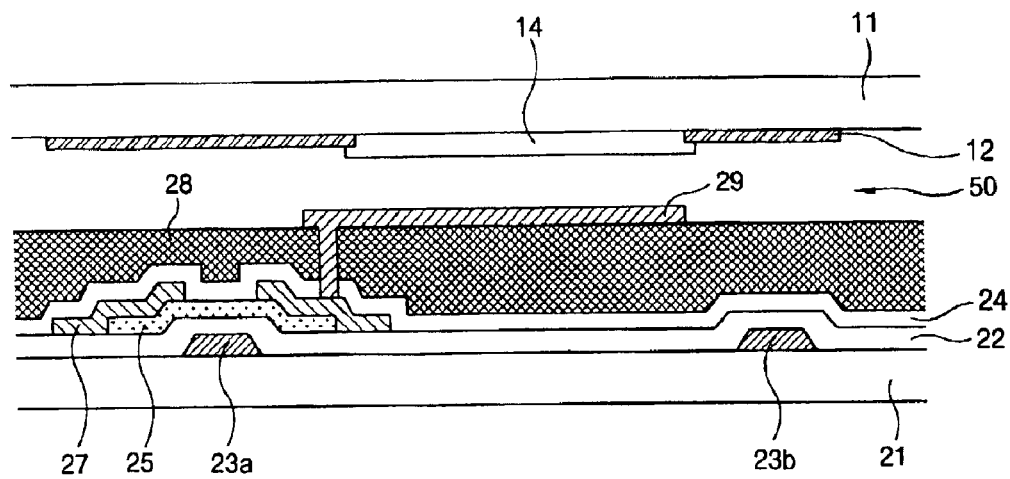
FIG. 12 is a cross sectional view of an exemplary liquid crystal cell according to the present invention.

FIG. 12 is a cross sectional view of an exemplary liquid crystal cell according to the present invention. In FIG. 12, a liquid crystal cell includes a TFT substrate and a color filter substrate. The TFT substrate has a transparent glass substrate 21, a gate electrode 23a and a gate pad 23b formed on the transparent glass substrate 21, a gate insulating layer 22 formed on an entire surface of the glass substrate 21 to cover the gate electrode 23a and the gate pad 23b, a semiconductor layer 25 formed on the gate insulating layer 22, source and drain electrodes 27 formed on the semiconductor layer 25, an organic passivation layer 24 formed on the gate insulating layer 22 and the source and drain electrodes 27, a benzocyclobutene (BCB) layer 28 formed on the passivation layer 24 to have a flat upper surface, a pixel electrode 29 made of a transparent conductive material, such as indium tin oxide (ITO), connected to one of the source and drain electrodes 27 and formed on the upper surface of the BCB layer 28 of displaying area on the liquid crystal panel. The color filter substrate has a transparent glass substrate 11, a black matrix 12 formed on a region of the glass substrate 11 corresponding to the TFT formation region and the gate pad 23b formation region of the TFT substrate to block the light permeation to a non-displaying region, and a color filter layer 14 formed on the displaying region of the liquid crystal display device.

In addition, the liquid crystal cell includes a common electrode (not shown) formed on the color filter substrate corresponding to the pixel electrode 29, and an alignment film (not shown) formed on the color filter and TFT substrates for aligning liquid crystal molecules in the liquid crystal material 50. Since the BCB layer 28 has a lower dielectric constant than the inorganic passivation layer 24, a parasitic capacitance between the gate electrode 23a, the gate line 23a, and a data line (not shown) is not generated even when the gate electrode 23a, the gate line 23b, or the data line (not shown) overlaps the pixel electrode 29. Accordingly, the pixel electrode 29 can be arranged to overlap with the gate electrode 23a, the gate line 23b, or the data line (not shown), thereby increasing an aperture ratio of the liquid crystal display device.

Figure 13:
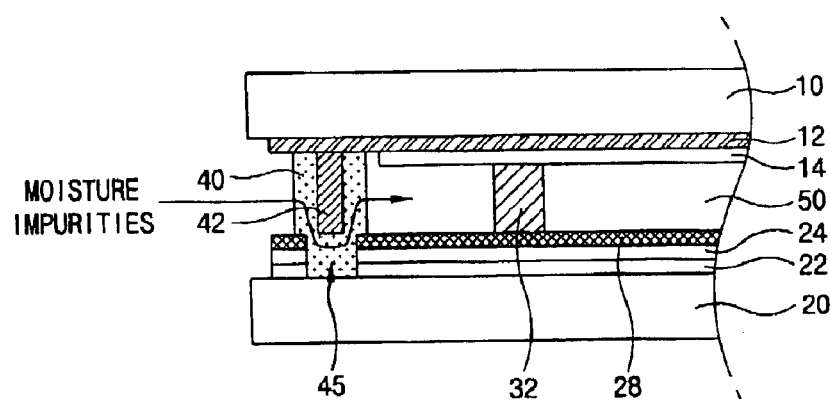
FIG. 13 is a cross sectional view of another exemplary sealing structure of a liquid crystal display device according to the present invention.

FIG. 13 is a cross sectional view of another exemplary sealing structure of a liquid crystal display device according to the present invention. In FIG. 13, portions of a gate insulating layer 22, a passivation layer 24, and a BCB layer 28 formed on a TFT substrate 10 may be removed to form a concavity region 45 that corresponds to a sealing unit 40. Alternatively, the concavity region 45 may be formed by removing only a portion of the BCB layer 28 and none of the gate insulating and passivation layers 22 and 24, or by removing all of the passivation and BCB layers 24 and 28 and only a portion of the gate insulating layer 22. Accordingly, the sealing unit 40 may be formed to directly contact the TFT substrate 20 and/or portions of the gate insulating layer 22 and/or the passivation layer 24 and/or the BCB layer 28. Thus, an attachment area of the sealing unit 40 and the TFT substrate 20 may be increased by forming the concavity region 45. In addition, a boundary of the TFT substrate 20 is increased, whereby an infiltration path of impurities along the boundary is also increased. Alternatively, the black matrix 12 may also include a concavity region that either extends completely through a thickness of the black matrix 12 to expose the color filter substrate 10, or may extend only partially through a thickness of the black matrix 12.

In FIG. 13, the sealing unit 40 may include a sealing pattern 42 formed within the sealing unit 40 to contact the black matrix 12 of the color filter substrate 10, wherein a height of the sealing pattern 42 is less than a height of the sealing unit 40. Accordingly, the sealing unit 40 improves adhesive contact between the color filter and TFT substrates 10 and 20, and the sealing pattern 42 effectively prevents infiltration of moisture or impurities into the liquid crystal material 50 through a boundary region between an upper surface of the passivation layer 24 and a lower surface of the sealing pattern 42. Alternatively, a lower portion of the sealing pattern 42 may extend into the concavity region 45 to further prevent infiltration of moisture or impurities into the liquid crystal material 50 through a boundary region between the lower surface of the sealing pattern 42 and an upper surface of the TFT substrate 20 or an upper surface of the gate insulating layer 22 and/or the passivation layer 24. Accordingly, an infiltration distance of impurities into the liquid crystal material 50 may be increased by removing a portion of the BCB layer 28 corresponding to the sealing unit 40.

In FIG. 13, a height of the sealing pattern 42 may be the same as the cell gap. However, even if the height of the sealing pattern 42 is less than the cell gap, the sealing pattern 42 is able to prevent infiltration of impurities into the liquid crystal material 50. Alternatively, a plurality of sealing patterns 42 may be formed, and a plurality of concavity regions 45 may be formed.

It will be apparent to those skilled in the art that various modifications and variations can be made in the liquid crystal display device sealing structure and method of fabricating the same of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a liquid crystal panel having first and second substrates attached to each other and separated by a spacer;
   a sealing unit for sealing the first and second substrates along a peripheral area of the liquid crystal panel; and
   a pattern for increasing an attachment area and infiltration distance of impurities through the sealing unit to prevent impurities from penetrating into the liquid crystal panel, the pattern being disposed within the sealing unit.

2. The device according to claim 1, wherein the liquid crystal panel includes:
   a plurality of thin film transistors on the first substrate;
   a color filter layer on the second substrate; and
   a liquid crystal material between the first and second substrates.

3. The device according to claim 1, wherein the pattern is formed on at least one of the first and second substrates.

4. The device according to claim 1, wherein the spacer includes a ball spacer.

5. The device according to claim 1, wherein the spacer includes a patterned spacer.

6. The device according to claim 5, wherein the patterned spacer is formed on the second substrate.

7. The device according to claim 5, wherein the pattern and the patterned spacer are both formed of a same material.

8. The device according to claim 7, wherein the pattern and the patterned spacer are formed by a same process.

9. The device according to claim 1, wherein the pattern has substantially a same height as a height of a cell gap between the first and second substrates.

10. The device according to claim 1, wherein the pattern has a height less than a height of a cell gap between the first and second substrates.

11. A liquid crystal display device, comprising:
    a thin film transistor substrate including a plurality of thin film transistors each having a gate electrode, a gate insulating layer, a semiconductor layer, source and drain electrodes, and a passivation layer,
    a color filter substrate including a color filter layer, the color filter substrate attached to the thin film transistor substrate with a liquid crystal material therebetween to define a liquid crystal panel;
    a patterned spacer between the thin film transistor substrate and the color filter substrate to maintain a uniform cell gap therebetween;
    a sealing unit disposed along an outer edge of the liquid crystal panel between the thin film transistor substrate and the color filter substrate; and
    a system for increasing an attachment area and an infiltration distance of impurities in the sealing unit.

12. The device according to claim 11, wherein the system for increasing the attachment area and the infiltration distance includes at least one concavity region formed by removing a portion of the gate insulating layer and a portion of the passivation layer, and the concavity region is filled with sealant material.

13. The device according to claim 11, wherein the passivation layer includes benzocyclobutene.

14. The device according to claim 11, wherein the passivation layer includes a first passivation film including an inorganic material, and a second passivation film including benzocyclobutene.

15. The device according to claim 14, wherein the system for increasing the attachment area and the infiltration distance includes at least one concavity region formed by removing portions of the first and second passivation films.

16. A method for fabricating a liquid crystal display device, comprising:
    forming at least one sealing pattern along a peripheral area of one of a first substrate and a second substrate;
    forming a plurality of spacers on the one of a first substrate and a second substrate;
    forming a sealing unit to surround the at least one sealing pattern;
    forming a pattern within the sealing unit for increasing an attachment area and an infiltration distance of impurities through the sealing unit; and
    attaching the first and second substrates along the sealing unit to define a uniform gap therebetween.

17. The method according to claim 16, wherein the steps of forming at least one sealing pattern and forming a plurality of spacers are performed simultaneously.

18. The method according to claim 16, wherein a height of the at least one sealing pattern is substantially the same as the uniform cell gap.

* * * * *